J. A. CRANDALL.
Child's Carriage.
No. 98,670
Patented Jan. 11, 1870.
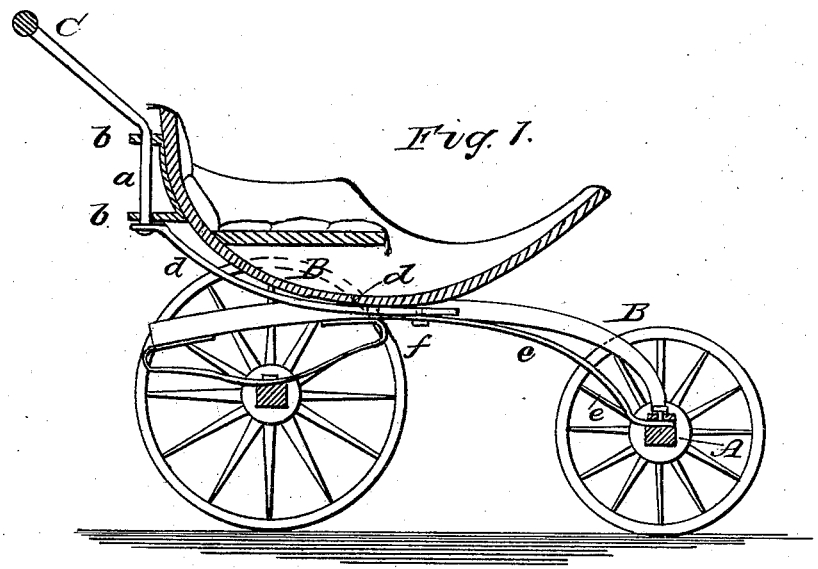
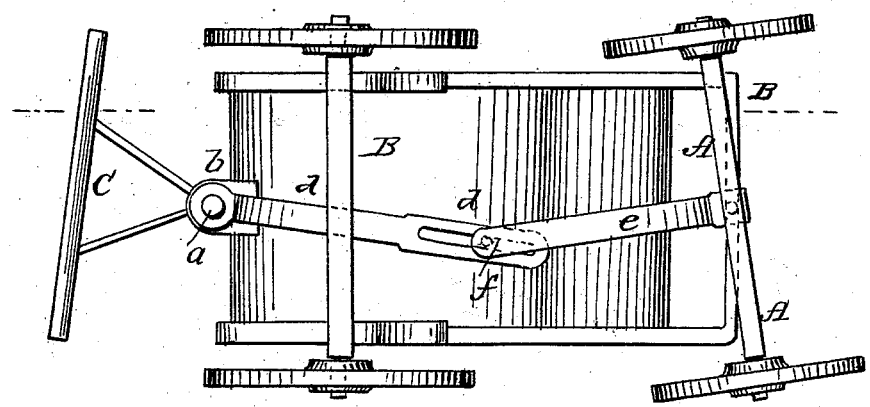

United States Patent Office.

JESSE A. CRANDALL, OF BROOKLYN, NEW YORK.

Letters Patent No. 98,670, dated January 11, 1870.

IMPROVEMENT IN CHILDREN'S CARRIAGES.

The Schedule referred to in these Letters Patent and making part of the same.

*To all whom it may concern:*

Be it known that I, JESSE A. CRANDALL, of Brooklyn, in the county of Kings, and State of New York, have invented a new and improved Perambulator; and do hereby declare that the following is a full, clear, and exact description thereof, which will enable others skilled in the art to make and use the same, reference being had to the accompanying drawings, forming part of this specification.

Figure 1 represents a vertical longitudinal section of my improved perambulator.

Figure 2 is an inverted plan view of the same.

Similar letters of reference indicate corresponding parts.

This invention has for its object to so improve the children's carriages known as perambulators, that the same can be readily steered by the person pushing the same forward. Heretofore, these vehicles have had the front axles fixed or hung, so that they could not be swung for steering, and the hubs of the front wheels were consequently chafed and injured whenever curves were described.

In order to overcome this inconvenience, I pivot the front axle A, at the middle, to the frame B, and connect it with the rear handle C, so that by means of such rear handle the vehicle can be readily steered.

The most convenient connection for this purpose is to swivel the shank $a$ of the handle in ears $b$, that project backward from the frame B, and in securing to the lower end of such shank a forward-projecting arm, $d$, which is pivoted to an arm, $e$, projecting backward from the front axle, as shown.

One of the arms is slotted to receive the connecting-pin $f$, as shown.

Thus, by swinging the handle C, the device is steered in the desired direction, and at the same time the handle serves to push the device forward.

Having thus described my invention,

I claim as new, and desire to secure by Letters Patent—

1. The handle C of a children's carriage, pivoted to the carriage, and connected with the front axle, for steering the vehicle, by means substantially as set forth.

2. The pivoted front axle A, having the arm $e$, in combination with the arm $d$ and handle C, the latter swivelled upon a bracket of the body or frame B, all arranged as set forth.

JESSE A. CRANDALL.

Witnesses:
GEO. W. MABEE,
ALEX. F. ROBERTS.